United States Patent
Li

(10) Patent No.: US 10,108,315 B2
(45) Date of Patent: Oct. 23, 2018

(54) USER-SELECTED VIDEO FRAME CAPTURE IN A VIDEO STREAMING ENVIRONMENT

(75) Inventor: Wenlong Li, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 948 days.

(21) Appl. No.: 13/977,095

(22) PCT Filed: Jun. 27, 2012

(86) PCT No.: PCT/CN2012/077607
§ 371 (c)(1),
(2), (4) Date: Apr. 1, 2014

(87) PCT Pub. No.: WO2014/000176
PCT Pub. Date: Jan. 3, 2014

(65) Prior Publication Data
US 2014/0208207 A1    Jul. 24, 2014

(51) Int. Cl.
*G06F 3/0484* (2013.01)
*G06F 3/01* (2006.01)
(Continued)

(52) U.S. Cl.
CPC ............ *G06F 3/0484* (2013.01); *G06F 3/017* (2013.01); *G06F 3/04842* (2013.01);
(Continued)

(58) Field of Classification Search
None
See application file for complete search history.

(56) References Cited

U.S. PATENT DOCUMENTS 7,729,880 B1 *  6/2010  Mashburn ............... H04L 67/12
                                                      702/151
9,514,100 B2 * 12/2016  Li .......................... G06F 17/212
(Continued)

FOREIGN PATENT DOCUMENTS

CN        1863282         11/2006
CN        1863282  A      11/2006
(Continued)

OTHER PUBLICATIONS

International Search Report and Written Opinion, dated Mar. 28, 2013, Application No. PCT/CN2012/077607, Filed Date: Jun. 27, 2012, pp. 12.

(Continued)

*Primary Examiner* — Taghi T Arani
*Assistant Examiner* — F J Farhadian

(57) ABSTRACT

Various embodiments are generally directed to cooperation among networked devices to obtain and use a multiple-frame screenshot. In one embodiment, an apparatus comprises a processor circuit executing instructions that cause the processor circuit to receive a signal conveying a video stream from a source device; visually present video frames of the video stream on a display associated with the apparatus; maintain a rolling buffer comprising a plurality of video frames; recurringly update the plurality of video frames to represent a subset of video frames of the video stream most recently presented on the display; receive a signal indicative of a capture command; and preserve the subset of video frames as a multiple-frame screenshot in response to the capture command.

22 Claims, 7 Drawing Sheets

(51) Int. Cl.
*H04N 7/00* (2011.01)
*H04N 5/44* (2011.01)
*H04N 21/433* (2011.01)

(52) U.S. Cl.
CPC ........... *H04N 5/4448* (2013.01); *H04N 7/002* (2013.01); *H04N 21/4331* (2013.01); *H04N 21/4334* (2013.01)

(56) References Cited

U.S. PATENT DOCUMENTS

| | | | | |
|---|---|---|---|---|
| 2002/0051621 | A1* | 5/2002 | Cuccia | H04N 5/4401 386/356 |
| 2007/0046830 | A1* | 3/2007 | Chen | H04N 5/4448 348/715 |
| 2008/0111892 | A1* | 5/2008 | Kwon | H04N 1/212 348/220.1 |
| 2010/0013943 | A1* | 1/2010 | Thorn | H04N 5/232 348/222.1 |
| 2011/0103763 | A1* | 5/2011 | Tse | H04N 5/44543 386/201 |
| 2012/0146918 | A1* | 6/2012 | Kreiner | H04M 1/7253 345/173 |
| 2012/0147269 | A1* | 6/2012 | Cho | H04N 5/4448 348/552 |

FOREIGN PATENT DOCUMENTS

| | | |
|---|---|---|
| CN | 101184219 A | 5/2008 |
| CN | 101938653 | 1/2011 |
| CN | 101938653 A * | 1/2011 |
| CN | 102158732 | 8/2011 |
| CN | 102158732 A | 8/2011 |
| EP | 2464103 | 6/2012 |
| WO | 9913639 | 3/1999 |

OTHER PUBLICATIONS

Extended European Search Report received for European Patent Application No. 1288058.8, dated Feb. 3, 2016, 7 pages.
Office Action received for Chinese Patent Application No. 201280073484.1, dated Feb. 23, 2017, 13 pages (untranslated).

* cited by examiner

USER-SELECTED VIDEO FRAME CAPTURE IN A VIDEO STREAMING ENVIRONMENT

TECHNICAL FIELD

Various embodiments are generally directed to cooperation among networked devices to obtain and use a multiple-frame screenshot. Some embodiments are particularly directed to interaction between a viewing device and a selection device to obtain a screenshot from a video stream to enable user selection and use of content of a video frame.

BACKGROUND

Video displays presenting continuously changing visual content are becoming ever more prevalent. Having been a presence in homes, hotel rooms and other private spaces for decades, they are increasingly used to convey information, provide entertainment, and to advertise goods and services in public forums in place of manned information booths and various forms of fixed signage. For example, it has become commonplace for travel information at airports, bus terminals and train stations to be presented on video displays, thereby enabling such information as departure times, arrival times and cancellations to be more immediately updated by minimal personnel from a single remote location. It has also become commonplace for public waiting areas to be equipped with video displays presenting those who are waiting therein with entertainment and informational content related to the location or the services for which they are waiting in an effort to entertain and answer frequently asked questions. It has further become commonplace for video displays to be positioned along public walkways and roadways to advertise, announce upcoming events, and to highlight a nearby location at which an advertised service may be provided.

Unfortunately, the often changing nature of the presented content and/or its presentation to individuals in the midst of moving about while conducting their own activities often means that an individual who sees something presented that is of interest is not able to fully glean the information needed to act upon what they have seen and write it down or record it in some other way before it is no longer visible to them. It is commonplace to "rotate" content such that no one item remains displayed for very long, and in the case of a video display positioned along a walkway or roadway, a person who may see something of interest is often already on the way to another location such that they are unable to linger and continue viewing that video display. It is with respect to these and other considerations that the techniques described herein to capture a multiple-frame screenshot are needed.

DETAILED DESCRIPTION

Figure 1:
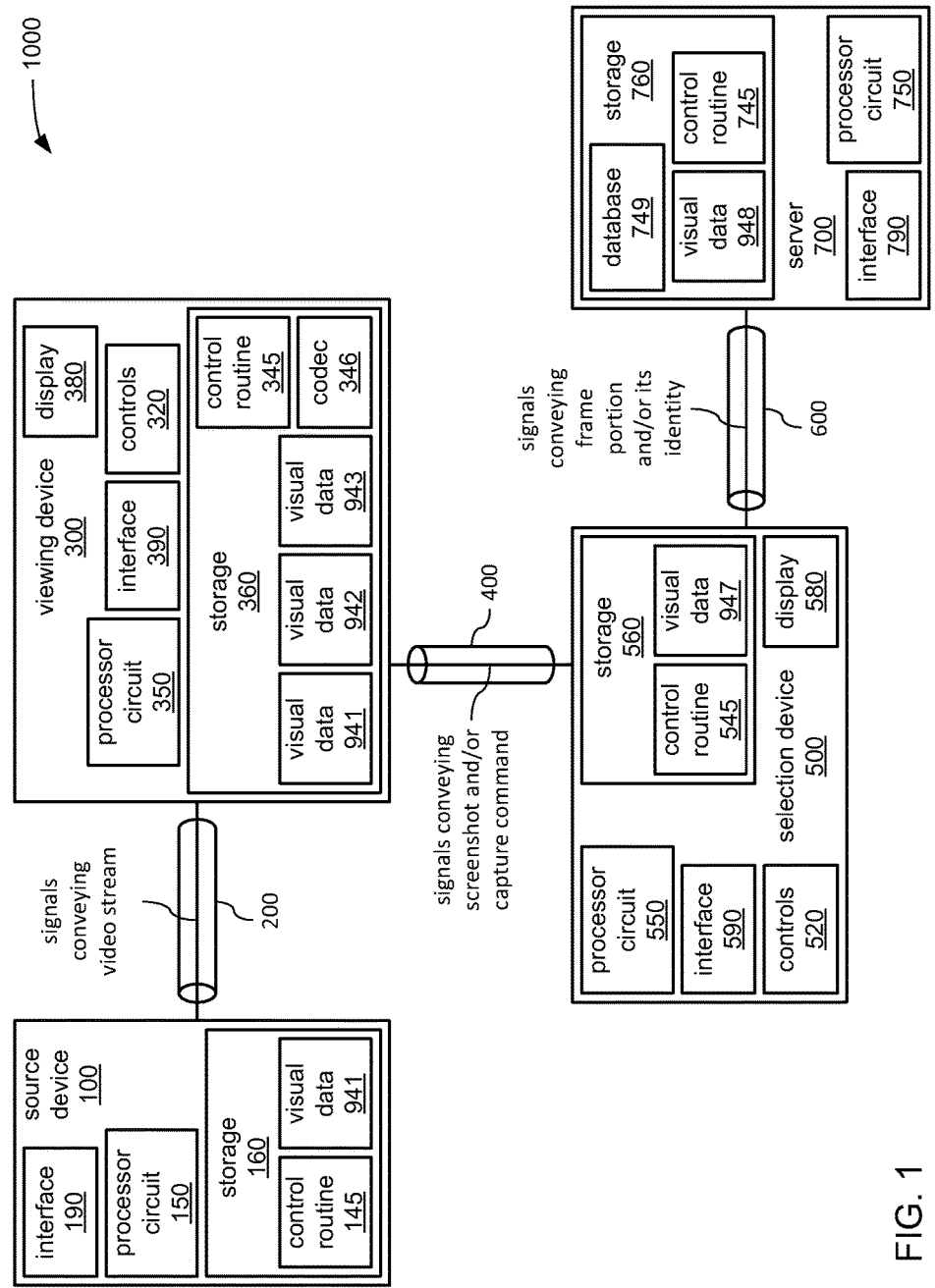
FIG. 1 illustrates an embodiment of an interaction among computing devices.

Various embodiments are generally directed to cooperation among networked devices to obtain and use a multiple-frame screenshot. Some embodiments are particularly directed to interaction between a viewing device and a selection device to obtain a screenshot from a video stream, to enable user selection and use of content of a video frame.

More specifically, in an interaction between a viewing device presenting a video stream of visual content (e.g., a video display in a shopping mall or train station, a networked television, etc.) and a selection device (e.g., a smartphone, laptop computer, etc.), the viewing device is signaled to capture a screenshot of a portion of the video stream going back in time for a predetermined period of time for subsequent retrieval. The screenshot is comprised of multiple video frames comprising only a subset of a greater quantity of video frames that comprise that portion of the video stream. The viewing device then relays the multiple-frame screenshot to the selection device, enabling viewing of the individual video frames of that subset by a user of the selection device to enable the user to find a video frame depicting an item of interest to the user (e.g., an item the user may wish to buy, an entry in a list of train arrivals, a graphical code leading to information, etc.). Thus, an advantage of capturing a multiple-frame screenshot going back a predetermined period of time's worth of video frames of a video stream is enabling a person to see again an item of interest to them, possibly at a later time that is more convenient to them.

In a possible further interaction between the selection device and a server, a portion of the video frame depicting the item of interest may be relayed to the server to enable the server to provide a service associated with the item of interest (e.g., identifying the item, making a purchase associated with the item, etc.). Thus an advantage of enabling a person to retrieve a video frame depicting an item of interest to them is enabling them to make use of the image of that item in a visual search performed on a server to identify it, instead of that person having to resort to their own memory of what the item looked like as a basis for creating a textual description to use in searching for the item, themselves.

In one embodiment, for example, an apparatus comprises a processor circuit; and a storage communicatively coupled to the processor circuit and storing a sequence of instructions that when executed by the processor circuit, causes the processor circuit to: receive a signal from a source device communicatively coupled to the apparatus, the signal conveying a video stream from the source device to the apparatus; present video frames associated with the video stream on a display associated with the apparatus; maintain a rolling buffer comprising a plurality of video frames within the storage; recurringly update the plurality of video frames to represent a subset of video frames associated with the video stream most recently presented on the display; receive a signal indicative of a capture command; and preserve the subset of video frames as a multiple-frame screenshot in response to the capture command. Other embodiments may be described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a multi-frame screenshot capture system 1000 comprising one or more of a source device 100, a viewing device 300, a selection device 500, and a server 700. Each of the devices 100, 300, 500 and 700 may be any of a variety of types of computing device, including without limitation, a desktop computer system, a data entry terminal, a laptop computer, a netbook computer, a tablet computer, a handheld personal data assistant, a smartphone, a body-worn computing device incorporated into clothing, a computing device integrated into a vehicle, etc. In various embodiments, the source device 100 and the viewing device 300 exchange signals via a link 200, the viewing device 300 and the selection device 500 exchange signals via a link 400, and the selection device 500 and the server 700 exchange signals via a link 600. Each of the links 200, 400 and 600 may be based on any of a variety of communications technologies by which signals may be exchanged, including without limitation, wired technologies employing electrically and/or optically conductive cabling, and wireless technologies employing infrared, radio frequency or other forms of wireless transmission. The links 200, 400 and 600 may be implemented in a manner in which each is entirely separate and distinct from the others, perhaps with each employing entirely different communications technologies. Alternatively, one or more of the links 200, 400 and 600 may be formed through use of protocols or other control mechanisms through a shared communications network such that their separation from each other may be relatively virtual.

In various embodiments, and as will be explained in greater detail, the source device 100 conveys a video stream through the link 200 to the viewing device 300 to be visually displayed by the viewing device 300. The viewing device 300 maintains a continuously updated subset of a predetermined quantity of the most recently displayed video frames of the video stream in a rolling buffer. In response to input indicative of a capture command from a person viewing the viewing device 300, the viewing device 300 stores that buffer as it exists at that time, thereby performing a capture of a multiple-frame screenshot representative of the predetermined amount of the video stream that has been displayed up to that time. The viewing device 300 conveys the screenshot through the link 400 to the selection device 500 in response to further input or as a result of being previously configured to do so. The selection device 500 is operated by a user of at least the selection device 500 to select one of the video frames of that screenshot that comprises an image of an item of interest to the user, thereby enabling the user to at least see the item, again. The selection device 500, possibly in response to possible further operation by the user, conveys the image of the item (by conveying either a portion of or all of the selected video frame) through the link 600 to the server 700 to at least enable the object to be identified by the server 700, and possibly to provide a further services associated with the item to the user.

In various embodiments, the source device 100 comprises a storage 160 storing at least a control routine 145 and a visual data 941, a processor circuit 150, and an interface 190. The visual data 941 comprises a video stream. In executing a sequence of instructions of at least the control routine 145, the processor circuit 150 is caused to operate the interface 190 to transmit the visual data 941 (e.g., transmit the video stream) to other computing devices (e.g., to viewing device 300).

In various embodiments, the viewing device 300 comprises a storage 360 storing at least a control routine 345, a codec 346, the visual data 941 received from a source device (e.g., from the source device 100 via the link 200), a visual data 942 and a visual data 943; a processor circuit 350; manually-operable controls 320; a visual display 380 and an interface 390. In executing a sequence of instructions of at least the control routine 345, the processor circuit 350 is caused to operate the interface 390 to receive the visual data 941 and to store it within the storage 360. The codec 346 comprises a sequence of instructions to decompress a video stream in which the video frames are in a compressed form for ease of transmission and storage. Codecs are commonly developed separately from other pieces of software, and are licensed or purchased for being included with a computing device provided to others (e.g., the viewing device 300). In further executing the control routine 345, the processor circuit 350 is caused to employ the codec 346 to decompress the video stream of the visual data 941 and store the decompressed form of the video stream as at least a portion of the visual data 942.

As those skilled in the art of the visual display of a video stream will readily recognize, it is common practice to store only relatively few of the most recently received video frames of a video stream for the purpose of displaying it, often less than the most recent second's worth of a video stream (perhaps only one video frame) at any given time. To enable the capture of a portion of the video stream spanning an appreciably greater predetermined period of time (e.g., 30 seconds of time, up to a minute of time, 1 to 2 minutes of time, etc.), the processor circuit 350 is also caused by the control routine 345 to recurringly copy a subset of the video frames of the video stream, either in its compressed form (e.g., the visual data 941) or in its decompressed form (e.g., the visual data 942), to form a rolling buffer of video frames that spans that predetermined length of time as at least a portion of the visual data 943. This rolling buffer is continuously updated so as to always represent the most recently displayed portion or video frames of the video stream going back for the predetermined period of time. In response to receiving a command to capture a screenshot, either through the interface 390 from another device or through operation of the controls 320, the processor circuit 350 is further caused to preserve the video frames present in the rolling buffer of the visual data 943 at that time. In this way, a multiple-frame screenshot is captured that represents a portion of the video stream displayed up to the moment the capture command is acted upon (e.g., up to the time video frames of the rolling buffer are preserved) and spanning the predetermined length of time into the past from that moment. The processor circuit 350 is caused to operate the interface 390 to transmit the screenshot comprising those stored video frames to the selection device 500 via the link 400, possibly in response to a signal conveying a command to provide the captured multiple-frame screenshot or possibly as a result of having been previously configured to do so.

In various embodiments, the source device 500 comprises a storage 560 storing at least a control routine 545 and a visual data 947, a processor circuit 550, manually-operable controls 520, a visual display 580, and an interface 590. In executing a sequence of instructions of at least the control routine 545, the processor circuit 550 is caused to operate the interface 590 to receive the multiple-frame screen shot comprising the stored video frames transmitted by the viewing device 300, and to store it within the storage 560 as at least a portion of the visual data 947. In response to operation of the controls 520 by the user of at least the source device 500, the processor circuit 550 is caused to visually present various ones of the video frames of the screenshot on the display 580, enabling the user to locate a video frame comprising an image of an item of interest to the user, and thereby allowing the user to see the item, again, despite possibly no longer being shown on the display 380 of the viewing device 300. In response to possible further operation of the controls 520 (perhaps again by the same user), the processor circuit 550 may be further caused by at least the control routine 545 to operate the interface 590 to transmit the image of the item of interest to a server (e.g., the server 700) to enable the item to be identified, possibly through use of the image of the item in a visual search performed against a database of images of items.

In various embodiments, the server 700 comprises a storage 760 storing at least a control routine 745, a database 749 and a visual data 948; a processor circuit 750; and an interface 790. In executing a sequence of instructions of at least the control routine 745, the processor circuit 750 is caused to operate the interface 790 to receive the image of the item of interest transmitted by the selection device 500 via the link 600, and to store it within the storage 760 as at least a portion of the visual data 948. The processor circuit 750 is further caused to use the image of the visual data 948 in searching the database 749 to attempt to identify the item of interest that is depicted there. Presuming the attempt at identification is successful, the processor circuit 750 operates the interface 790 to signal the selection device 500 through the link 600 with an indication of the identity of the item. Depending on what other services are offered by the server 700, responsive to further signals received from the selection device 500 indicative of further operation of the controls 520, the processor circuit 750 may be further caused to cooperate with the selection device 500 in carry out a transaction associated with the item (e.g., a purchase of the item, a search for where a person may travel to see the item, etc.).

In various embodiments, each of the processor circuits 150, 350, 550 and 750 may comprise any of a wide variety of commercially available processors, including without limitation, an AMD® Athlon®, Duron® or Opteron® processor; an ARM® application, embedded and secure processors; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of the processor circuits 150, 350, 550 and 750 may comprise a multi-core processor (whether the multiple cores coexist on the same or separate dies), and/or a multi-processor architecture of some other variety by which multiple physically separate processors are in some way linked.

In various embodiments, each of the storages 160, 360, 560 and 760 may be based on any of wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of the storages 160, 360, 560 and 760 are depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM).

In various embodiments, one or more of the control routines 145, 345, 545 and 745 may comprise an operating system that may be any of a variety of available operating systems appropriate for whatever corresponding ones of the processor circuits 150, 350, 550 and 750 comprise, including without limitation, Windows™, OS X™, Linux®, or Android OS™

In various embodiments, each of the interfaces 190, 390, 590 and 790 employ any of a wide variety of signaling technologies enabling each of devices 100, 300, 500 and 700 to be coupled through one or more of the links 200, 400 and 600. Each of these interfaces comprises circuitry providing at least some of the requisite functionality to enable access to one or more of these links. However, each of these interfaces may also be at least partially implemented with sequences of instructions executed by corresponding ones of the processor circuits 150, 350, 550 and 750 (e.g., to implement a protocol stack or other features). Where one or more of the links 200, 400 and 600 employs electrically and/or optically conductive cabling, corresponding ones of the interface 190, 390, 590 and 790 may employ signaling and/or protocols conforming to any of a variety of industry standards, including without limitation, RS-232C, RS-422, USB, Ethernet (IEEE-802.3) or IEEE-1394. Alternatively or additionally, where one or more of the links 200, 400 and 600 entails the use of wireless signal transmission, corresponding ones of the interfaces 190, 390, 590 and 790 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1 xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190, 390, 590 and 790 are depicted as a single block, one or more of these may comprise multiple interfaces that may be based on differing signaling technologies. This may be the case especially where one or more of these interfaces couples corresponding ones of the devices 100, 300, 500 and 700 to more than one of the links 200, 400 and 600 that employ differing communications technologies.

In various embodiments, each of the controls 320 and 520 may comprise any of a variety of types of manually-operable controls, including without limitation, lever, rocker, pushbutton or other types of switches; rotary, sliding or other types of variable controls; touch sensors, proximity sensors, heat sensors or bioelectric sensors, etc. Each of the controls 320 and 520 may comprise manually-operable controls disposed upon a casing of corresponding ones of the devices 300 and 500, and/or may comprise manually-operable controls disposed on a separate casing of a physically separate component of corresponding ones of the device 300 and 500 (e.g., a remote control coupled to other components via infrared signaling).

In various embodiments, each of the displays 380 and 580 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the devices 300 and 500, or may be disposed on a separate casing of a physically separate component of corresponding ones of the device 300 and 500 (e.g., a flat panel monitor coupled to other components via cabling).

In one example embodiment, the source device 100 is an optical disk player maintained by a cable television service provider, the viewing device 300 is a television within a room of a home, the selection device 500 is a tablet computer of an occupant of the home, and the server is maintained by a provider of online sales services through the Internet. In this example, the occupant uses the viewing device 300 to view a television program broadcast by the cable television service provider from the source device 100. Thus, the source device 100 is employed to broadcast a video stream, the content of which is a video stream comprising many video frames stored as the visual data 941 on an optical storage media of the storage 160. The link 200 comprises broadband coaxial electrical signal cabling and/or fiberoptic cabling to convey the signals conveying the video stream to the home and the viewing device 300, therein.

While viewing the broadcast of this video stream (e.g., a film), the occupant sees an item that catches their interest (e.g., a monument that the occupant is considering visiting, a product that the occupant is considering buying, etc.), but the item is displayed only briefly amidst the changing imagery of the video stream. The occupant tries to quickly locate the remote control that accompanies the viewing device 300, and then presses a button among the controls 320 disposed on the remote control to signal the viewing device 300 to capture the last minute or multiple minutes of the imagery that has been visually displayed on the display 380. In response to this signal received from the occupant, the video frames of the rolling buffer maintained by the processor circuit 350 as at least part of the visual data 943 are caused to be stored by the processor circuit 350 such that the video frames of the rolling buffer for the last minute or multiple minutes up to that time are preserved for subsequent transmission to another device (e.g., the selection device 500). In other variations, the viewing device 300 may receive this signal to capture imagery from that other device, from a microphone of the viewing device 300 conveying a detected verbal command to capture imagery, from a camera of the viewing 300 conveying a detected hand gesture associated with capturing imagery, etc.

The occupant subsequently finds the selection device 500, and operates the controls 520 (perhaps comprising a touch-sensitive grid overlain atop the display 580) to cause the selection device 500 to signal the viewing device 300 via the link 400 to provide the stored video frames of the rolling buffer for that minute or multiple minutes to the selection device 500. In this example, the link 400 may comprise a wireless home network maintained by the occupant by which the devices 300 and 500, and perhaps still other devices, are able to exchange signals. The signaling of the viewing device 300 to provide the stored video frames may entail the occupant having to operate the controls 520 to specify the viewing device 300 as the recipient of the signal. Alternatively, where there may be more than one device configured to similarly capture multiple-frame screen shots, the signal to provide such stored video frames may be transmitted to all of such devices in the home such that all of such devices having such stored video frames may transmit them to the selection device 500 for the occupant to view thereon. Following receipt of those video frames (whether from the viewing device 300, alone, or along with video frames from other devices), and responsive to further operation of the controls 520 by the occupant, the processor circuit 550 visually displays various ones of the received video frames on the display 580, enabling the occupant to look for and locate a one of the video frames comprising an image of the item. In still other variations, the viewing device 300 may automatically transmit the stored video frames of the rolling buffer for that minute or multiple minutes to the selection device 500 in response to having previously been configured to do so at some earlier time.

The occupant may still further operate the controls 520 to select a one of the video frames comprising an image of the item to transmit to a server (e.g., the server 700) to have the item identified, to obtain more information concerning the item and/or to carry out a transaction associated with the item. Responsive to such use of the controls 520, the selection device 500 contacts the server 700 across the Internet through the link 600, and conveys at least a portion of the selected video frame to the server 700 to enable the server 700 to at least identify the item. Presuming the server 700 is successful in identifying the item, the server 700 signals the selection device 500 with the results to be visually displayed on the display 580 for the occupant to consider. The link 600 may comprise the same wireless home network as the link 400, with the wireless home network providing access for the selection device 500 to a gateway or other network access device coupling the wireless home network to the Internet. It may further be that the link 200 also comprises the same wireless home network and the broadcasting of the video stream may have been an "online" broadcast through the Internet.

In another example embodiment, the source device 100 is a server maintained at a train station, the viewing device 300 is a monitor in a public walkway of the train station, the selection device 500 is a smartphone carried by a commuter making their way between trains at that train station, and the server is maintained by a purveyor of tickets for trains and other forms of transportation through the Internet. In this example, the commuter is viewing device 300 to locate information concerning departure times for trains one their way to a particular destination. However, it may be that there are simply so many different trains departing at different times to different places that the particular departure times for the particular trains of interest to the commuter appear only briefly at intervals separated by lengthy periods of time of displaying information concerning other trains not of interest to the commuter. Thus, the source device 100 is employed to provide the viewing device 300 with a video stream in which the video frames represent repeatedly rotated images of text of train information, likely stored as the visual data 941 on a ferromagnetic disk drive of the storage 160. The link 200 comprises conductive network cabling routed throughout the structure of the train station to convey the signals conveying the video stream to viewing device 300 therein.

While viewing the visual display of train information, the commuter sees a listing of trains heading to the particular destination, but the quantity of entries in the listing is too numerous to read all of them and select one before another rotation of the presented content occurs such that what is presented is no longer of interest to the commuter. The commuter operates the controls 520 of the selection device 500 to signal the viewing device 300 over the link 400 to capture the last minute or minutes of the imagery that has been visually displayed on the display 380. In this example, the link 400 may comprise line-of-sight infrared wireless communication or relatively low-power close-range radio frequency wireless communication to aid users in using physical close proximity to the viewing device 300 as a mechanism to choose to communicate with it versus other similar devices that may be positioned elsewhere in the train station. In response to this signal received from the selection device 500, the video frames of the rolling buffer maintained by the processor circuit 350 as at least part of the visual data 943 are caused to be stored by the processor circuit 350 such that the video frames of the rolling buffer for the last minute or minutes up to that time are preserved for subsequent transmission to another device (e.g., the selection device 500).

The commuter subsequently operates the controls 520 to cause the selection device 500 to signal the viewing device 300 via the link 400 to provide the stored video frames of the rolling buffer for that minute or minutes to the selection device 500. Alternatively, the signal conveying the command to capture the last minute or minutes of imagery may also have signaled the view device 300 to provide the stored video frames to the selection device 500 such that no further action is required of the commuter to cause the viewing device 300 to do so. Given the placement of the viewing device 300 in a public forum where numerous individuals may interact with it at any given time, the signals transmitted by the selection device 500 to the viewing device 300 may include an identifier that uniquely specifies the selection device 500 with each communication to separate it from communications involving devices similar to the selection device 500 that are carried by other people. In this way, the video frames of the rolling buffer that were stored in response to the commuter's signaling of the viewing device 300 with a capture command will be the video frames that will be provided to the selection device 500 and not video frames corresponding to someone else signaling the viewing device 300 with a capture command of their own. Following receipt of those video frames, and responsive to further operation of the controls 520 by the commuter, the processor circuit 550 visually displays various ones of the received video frames on the display 580, enabling the commuter to look for and locate a one of the video frames comprising an image of train listings of interest to the commuter.

The commuter may still further operate the controls 520 to select an entry on the located video frame comprising the listing of interest to transmit to a server (e.g., the server 700) to learn more about a particular entry in the listing for a particular train and/or to carry out a transaction associated with that particular train (e.g., attempt to purchase a ticket for it). In some embodiments, the controls 520 may be operable to enable the commuter to specify the entry of interest by cropping the image of the entire frame such that only the cropped portion is actually sent to the server 700. Responsive to such use of the controls 520, the selection device 500 contacts the server 700 across the Internet through the link 600 to convey an image to the server 700 (either of the whole video frame of train listings of interest or a cropped portion of that video frame) to enable the server 700 to at least identify the train associated with the entry of interest in preparation for carrying out a transaction associated with that train. Presuming the server 700 is successful in identifying that train, the server 700 signals the selection device 500 with the results to enable the commuter to proceed with carrying out a transaction, if the commuter desires to. The link 600 may comprise a wireless network made publicly available to those within the train station that provides access to a gateway or other network access device coupling that wireless network to the Internet.

Figure 2:
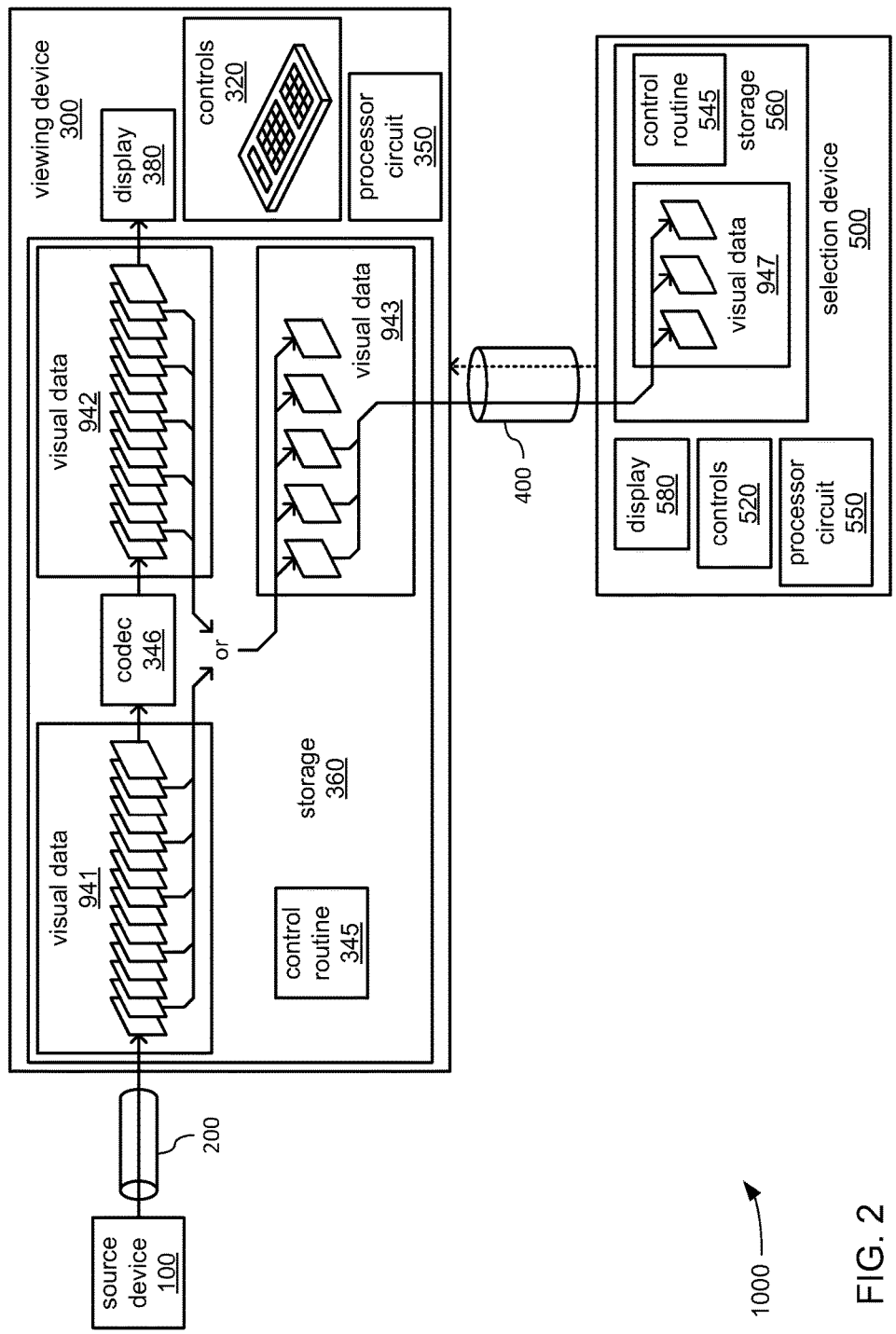
FIG. 2 illustrates a first portion of the embodiment of FIG. 1.

FIG. 2 illustrates a block diagram of a portion of the block diagram of FIG. 1 in greater detail. More specifically, aspects of the operating environment of the viewing device 300 in which the processor circuit 350 is caused by execution of the control routine 345 to cause the viewing device 300 to perform its aforedescribed functions are depicted. As previously discussed, the video stream received from the source device 100 is stored within the storage 360 as part of the visual data 941. Throughout the world in recent years, governments and industry have engaged in coordinated efforts to replace analog transmission of video with digital transmission. Thus, although the video stream may be received from the source device 100 in a transmission of analog signals in some embodiments, it is increasingly more likely that the video stream will be received as digital data representing the video frames of the video stream in a compressed form. Further, other digital data associated with the video frames (e.g., indications of resolution, color depth, color encoding, frame rate, etc.) is likely to accompany the video frames, and therefore, may also be stored as part of the visual data 941. The processing circuit 350 is caused to employ the codec 346 to decompress the video stream as it is stored as part of the visual data 941 and to store the resulting decompressed video frames provided by the decompression as at least part of the visual data 942 (again, other related data may also be stored as part of the visual data 942). The processor circuit 350 is then caused to employ the video frames of the visual data 942 in causing the visual content of the video stream to be visually displayed on the display 380.

As also previously discussed, as the receipt, storage, decompression and visual display of the video stream takes place, the processor circuit 350 is also caused to store a subset of the video frames of either the visual data 941 or the visual data 942 as part of a rolling buffer of the visual data 943 (again, possibly along with other related data). As those skilled in the art of digital transmission of video will readily recognize, most forms of digital transmission being adopted throughout the world employ variants of MPEG (Motion Picture Experts Group) encoding, which takes advantage of the tendency in motion video images for many aspects of the imagery in adjacent video frames to change by relatively small amounts. Thus, unlike uncompressed video which each pixel of the imagery in each video frame is fully and independently described for each video frame, MPEG distributes a relatively sparse number of independent frames (called "I-frames" or "intra-frames") in which the imagery is fully described among a greater number of "inter-frames" (of which there are two possible types called "D-frames" and "B-frames") in which the imagery is described as in color and/or locations of pixels from the imagery of a video frame preceding it or following it. The manner in which such differences are described in the data of the video stream for the B/D-frames takes up considerably less space than the full descriptions of all pixels for the I-frames, thereby reducing the overall amount of data that must be transmitted to convey a video stream.

The quantity of B/D-frames between each I-frame varies with the rate at which the imagery of the video stream changes. If the imagery changes to a great degree at a relatively rapid pace, then the mechanism by which differences are described for the B/D-frames can quickly become inefficient and/or begin to introduce an unacceptable degree of calculation error such that it become desirable to employ more I-frames that are more closely distributed in the video stream. Where the subset of video frames stored in the rolling buffer of the visual data 943 are taken from the visual data 942, the processing circuit 350 may be caused to select the video frames of the visual data 942 for inclusion in the rolling buffer at a regular interval (e.g., every Nth video frame of the visual data 942). However, where the subset of video frames stored in the rolling buffer of the visual data 943 are taken from the visual data 941, the processing circuit 350 may be caused to select only I-frames of the visual data 941 for inclusion in the rolling buffer of the visual data 943, possibly to avoid having to employ the codec 346 to create the contents of the rolling buffer.

Regardless of the exact manner in which video frames are selected for use in creating the rolling buffer of the visual data 943, in various embodiments, the length of the rolling buffer is selected to enable the provision of a series of video frames spanning a predetermined period of time into the past from a given moment when a capture command is acted upon. The predetermined period of time may be chosen to balance extending long enough into the past to increase the likelihood of an item of interest to a person being among the imagery of those video frames when a multiple-frame screenshot is captured, but not so long into the past as to create a multiple-frame screenshot comprising so many video frames as to be unwieldy for transmission or for being examined by a person seeking to find an image of an item of interest among them (e.g., 30 seconds, up to a minute, 1 to 2 minutes). Again, the rolling buffer of the visual data 943 is recurringly updated with newer video frames as the video stream continues to be received, stored, decompressed and visually displayed on the display 380. As ever newer video frames are included in the rolling buffer, the oldest video frames then present in the rolling buffer are replaced by those ever newer video frames.

As previously discussed, in various embodiments, the capture command may be conveyed by a person to the viewing device 300 either through manual operation of the controls 320 of the viewing device 300, itself, or through the link 400 from the selection device 500 (possibly as a result of the person operating the controls 520 to cause the selection device 500 to send the capture command). Again, as previously discussed, at least a subset of the controls 320 may be disposed on a remote control of the viewing device 300. However, as an alternative, the controls 320 may comprise a camera positioned with a view of persons viewing the display 380, where the processor circuit 350 is caused by the control routine 345 to monitor for an occurrence of a hand gesture or other identifiable movement of a person that is deemed to be a visual signal by a person conveying the capture command to the viewing device 300.

Regardless of the exact manner in which the viewing device 300 receives a signal conveying the capture command, the processor circuit 350 is caused to respond by preserving the video frames present within the rolling buffer of the visual data 943 at that time. In some embodiments, the processor circuit 350 copies from the rolling buffer a quantity of video frames extending the predetermined period of time into the past (from the time the capture command is acted on) into another portion of the storage 360, thereby allowing the rolling buffer to continue to be updated with ever newer video frames. In other embodiments, the rolling buffer may alternatively be configured to be of such size that it extends considerably longer into the past than the predetermined period of time, and the processor circuit 350 acts on the capture command by marking or otherwise identifying video frames within the rolling buffer as being the video frames to be included in that captured multiple-frame screenshot. In such other embodiments, the length of the rolling buffer is selected to be likely to be long enough to continue to hold all of the video frames of the screenshot for long enough to enable a person originating the capture command to act to have those video frames transmitted to another device (e.g., the selection device 500). In still other embodiments, the processor circuit 350 acts on the capture command by causing the rolling buffer to cease to be updated with ever newer video frames to preserve the video frames present within the rolling buffer at that time, and instead, instantiates and recurringly updates a new rolling buffer as part of the visual data 943.

Regardless of the exact manner in which the processor circuit 350 is caused to preserve a quantity of the video frames present in the rolling buffer of the visual data 943 extending the predetermined period of time into the past from the time the processor circuit 350 is acts on a capture command, the processor circuit 350 subsequently responds to receipt of a signal from the selection device 500 by conveying those preserved video frames to the selection device 500, thus conveying the screenshot comprising those video frames to the selection device 500. It should be noted that in embodiments in which the capture command is signaled to the viewing device 300 through the link 400 by the selection device 500, the capture command to capture a multiple-frame screenshot may also include the signal to the viewing device 300 to convey the screenshot. In such embodiments, depending at least on the available data bandwidth of the link 400, the processor circuit 350 may be caused to respond to such a signal by streaming video frames then present in the rolling buffer to the selection device 500 without performing a distinct action to preserve those video frames, thereby in essence preserving those frames by conveying them to the selection device 500.

Figure 3:
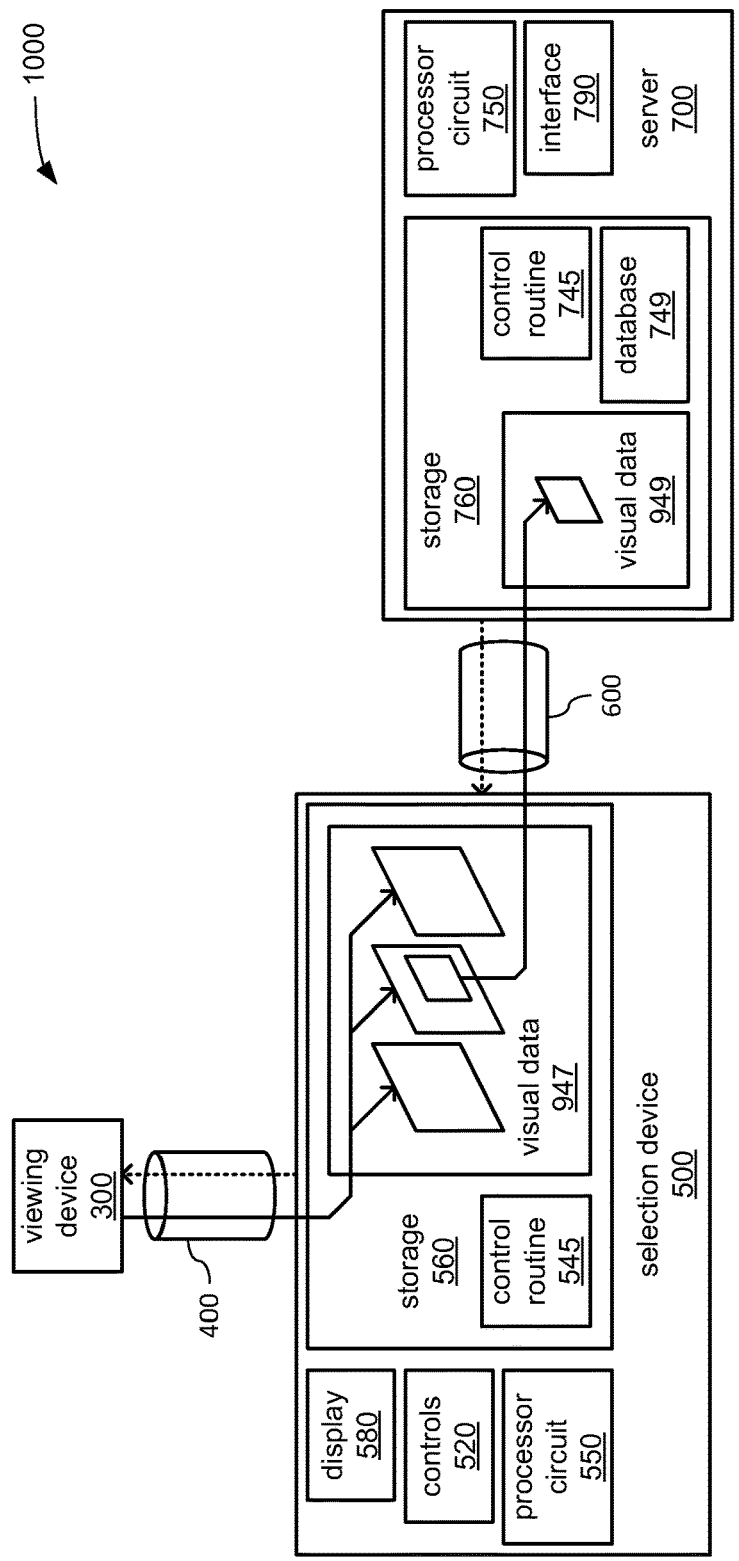
FIG. 3 illustrates a second portion of the embodiment of FIG. 1.

FIG. 3 illustrates another block diagram of a portion of the block diagram of FIG. 1 in greater detail. More specifically, aspects of the operating environment of the selection device 500 in which the processor circuit 550 is caused by execution of the control routine 545 to cause the selection device 500 to perform its aforedescribed functions are depicted. As previously discussed, the video frames of the captured multiple-frame screenshot are received from the viewing device 300, and are stored within the storage 560 as part of the visual data 947. Further, other digital data associated with these video frames (e.g., indications of resolution, color depth, color encoding, etc.) may accompany the video frames, and therefore, may also be stored as part of the visual data 947. The processing circuit 550 is caused to visually display these received video frames on the display 580 in a manner that is at least partly controlled by a person operating the controls 520 to examine each of these video frames to locate a video frame comprising an image of the item of interest to that person.

In various embodiments, the processor circuit 550, in executing at least the control routine 545, provides the person operating the controls 520 with a mechanism by which the person is able to mark a portion of the image of a frame depicting the item of interest. Such a mechanism may entail enabling the person to crop the image of the frame to a portion of the image. Where the controls 520 comprise a touch-sensitive overlay applied to the display 580 (such that a touch-sensitive display is created), a person may simply use one or more digits (e.g., one or more fingers) to "draw" a box, circle or other geometric shape around a portion of the image. Regardless of the exact manner in which a portion of the image of one of the video frames of the multiple-frame screenshot is marked by a person operating the selection device 500, the processor circuit 550 may further transmit the marked portion depicting the item of interest to the server 700 via the link 600 to enable the server 700 to at least identify it, provide information about it, and/or to enable the person to carry out a transaction concerning it.

As previously discussed, the processor circuit 750 of the server 700 is caused by execution of the control routine 745 to store the portion of the image as part of the visual data 949, and then to use the portion of the image to perform a visual search of at least the database 749 stored within the storage 760 to attempt to identify what the item of interest is. As also previously discussed, presuming that the item of interest is successfully identified, the server 700 signals the selection device 500 through the link 600 with the results of the search, the signal conveying an indication of what the item is.

Figure 4:
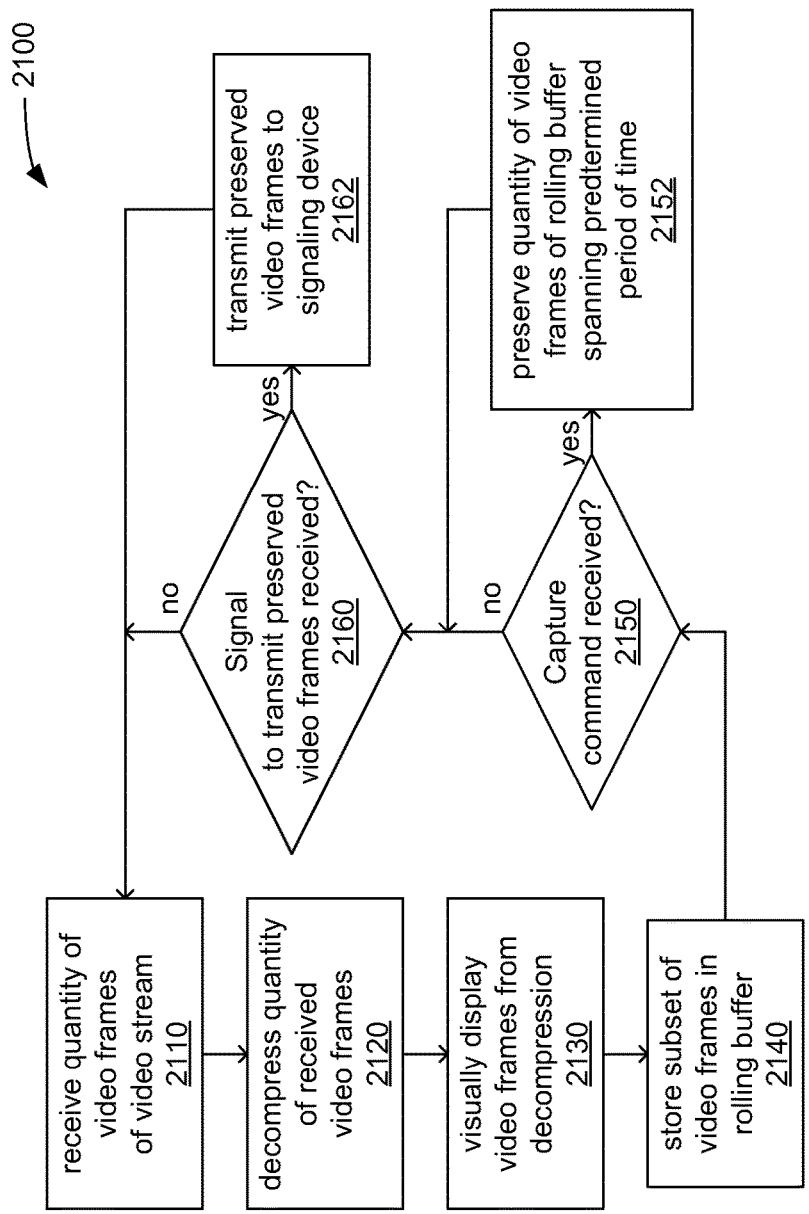
FIG. 4 illustrates an embodiment of a first logic flow.

FIG. 4 illustrates one embodiment of a logic flow 2100. The logic flow 2100 may be representative of some or all of the operations executed by one or more embodiments described herein. More specifically, the logic flow 2100 may illustrate operations performed by the processing circuit 350 of the viewing device 300 in executing the control routine 345.

At 2110, a viewing device (e.g., the viewing device 300) receives a quantity of video frames of a compressed video stream. At 2120, the viewing device employs a codec appropriate to the compression used in creating the video stream to decompress the quantity of received video frames. At 2130, the viewing device visually displays the video frames generated from the decompression of the quantity of received video frames.

At 2140, a subset of video frames is stored in a rolling buffer sized to store at least enough video frames to span a predetermined period of time going backwards from the most recent video frame added to the rolling buffer. As previously explained, the subset of video frames stored in the rolling buffer may be taken either from the received video frames of the video stream or from the video frames resulting from the decompression of video frames of the video stream.

At 2150, a check is made as to whether a capture command has been received. As previously discussed, either a control of the viewing device (e.g., the controls 320) may be operated by a user of the viewing device to signal the viewing device with the capture command, or another device (e.g., the selection device 500) may signal the viewing device with the capture command. Regardless of the exact manner in which the viewing device receives the capture command, if the capture command has been received, then the viewing device responds at 2152 by preserving a quantity of the video frames stored within the rolling buffer at the time the capture command is acted upon and going back in time for a predetermined period of time's worth of the streaming video from that time.

At time 2160, a check is made as to whether a signal to transmit the preserved video frames from the rolling buffer has been received from another device (e.g., the selection device 500). If that signal has been received, then at 2162, the viewing device responds to receipt of that signal by transmitting the preserved video frames to the device that transmitted the signal. As previously discussed, it may be that a single other device transmits both the capture command and the signal to transmit the preserved video frames, and it may be that both are transmitted with the same signal.

Figure 5:
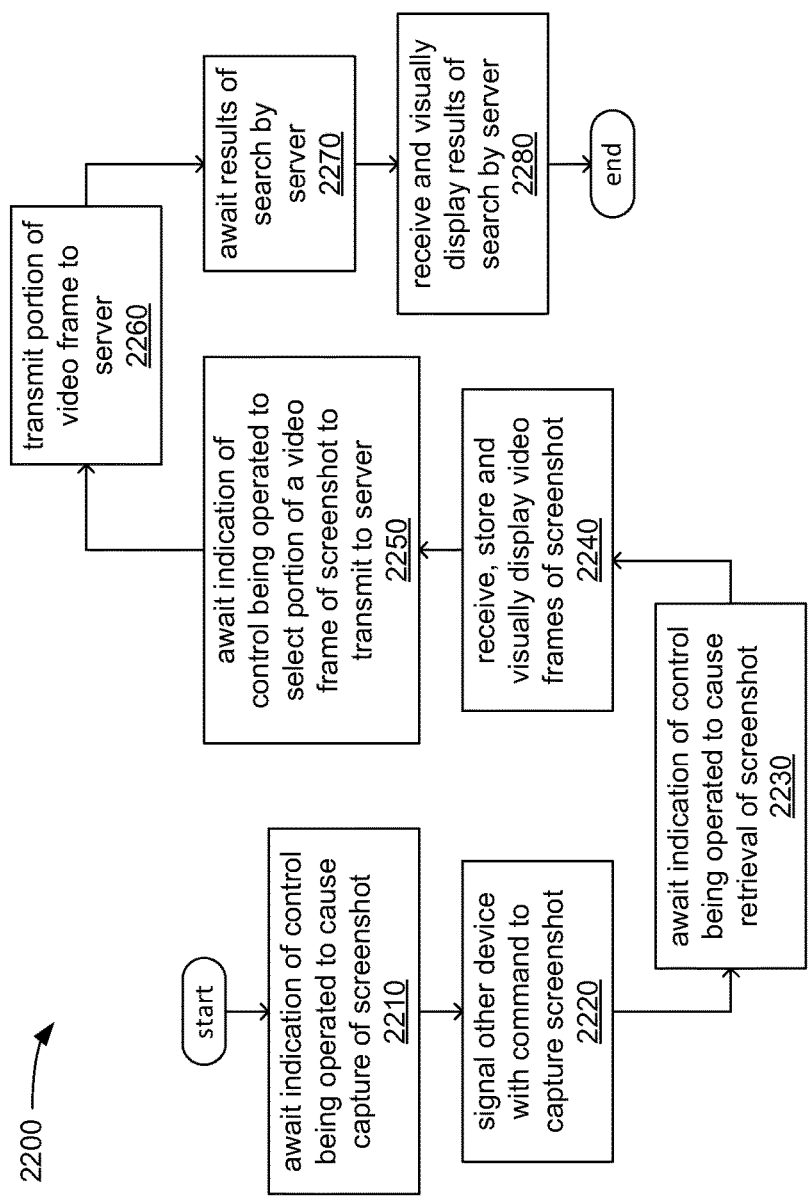
FIG. 5 illustrates an embodiment of a second logic flow.

FIG. 5 illustrates one embodiment of a logic flow 2200. The logic flow 2200 may be representative of some or all of the operations executed by one or more embodiments described herein. More specifically, the logic flow 2200 may illustrate operations performed by the processing circuit 550 of the selection device 500 in executing the control routine 545.

At 2210, a selection device (e.g., the selection device 500) awaits an indication of being signaled via its manually-operable controls to cause another device (e.g., the viewing device 300) to capture a multiple-frame screenshot. At 2220, in response to receiving such an indication of such a signal, the selection device signals the other device to capture a multiple-frame screenshot.

At 2230, the selection device awaits an indication of being signaled via its manually-operable controls to cause a retrieval of the captured screenshot from the other device. At 2240, in response to receiving such an indication of such a signal, the selection device signals the other device to transmit the multiple-frame screenshot to the selection device.

At 2250, the selection device awaits an indication of being signaled via its manually-operable controls to select a portion of a video frame of the screenshot to transmit to a server (e.g., the server 700). At 2260, in response to receiving such an indication of such a signal, the selection device transmits the selected portion of the video frame to the server.

At 2270, the selection device awaits results of a visual search performed by the server using the selected portion of the video frame of at least one database to attempt to identify an item depicted in the selection portion. At 2280, in response to receiving results of the search from the server, the selection device visually displays the results.

Figure 6:
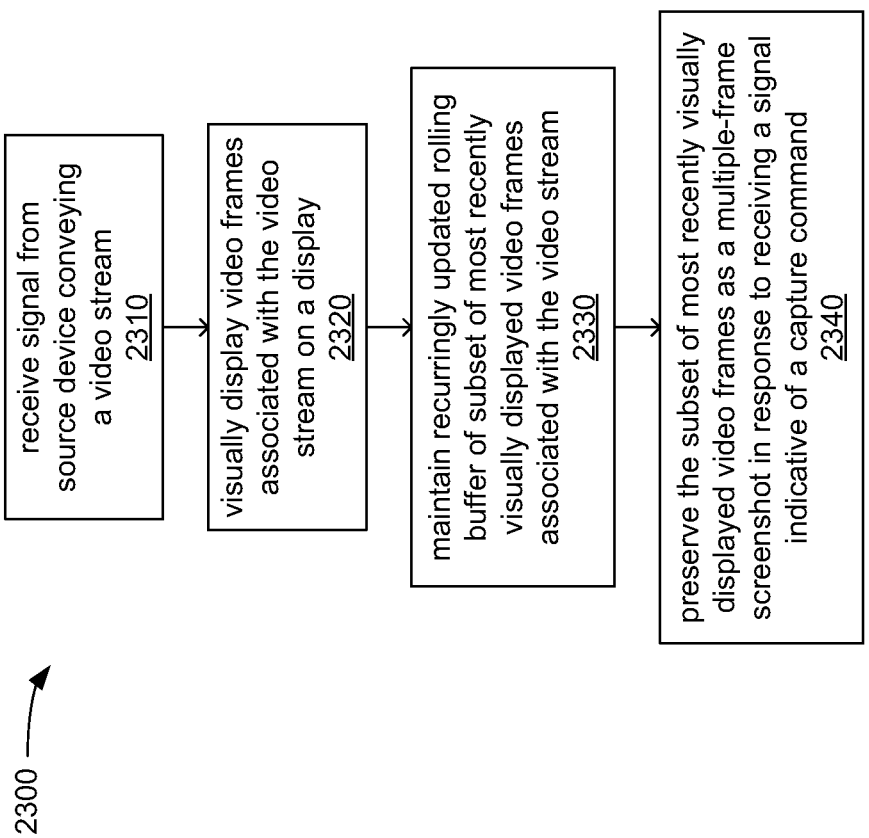
FIG. 6 illustrates an embodiment of a third logic flow.

FIG. 6 illustrates one embodiment of a logic flow 2300. The logic flow 2300 may be representative of some or all of the operations executed by one or more embodiments described herein. More specifically, the logic flow 2300 may illustrate operations performed by the processing circuit 350 of the viewing device 300 in executing the control routine 345.

At 2310, at least one component of a viewing device (e.g., the processor circuit 350 of the viewing device 300) receives a signal from a source device (e.g., the source device 100) conveying a video stream. As previously discussed, the video stream may be conveyed in a digital transmission comprising the signal in which the video stream is compressed (perhaps employing a variation of MPEG encoding).

At 2320, the at least one component visually displays video frames associated with the video stream on a display associated with the viewing device. As previously discussed, it may be that the viewing device comprises the display (e.g., the display 380). As also previously discussed, where the video stream is compressed, decompression may be carried out to decompress the video stream, providing uncompressed video frames that may be visually displayed.

At 2330, the at least one component of the viewing device maintains and recurringly updates a rolling buffer comprising a subset of video frames associated with the more recently visually displayed portion of the video stream. As previously discussed, where the video stream is compressed, the subset of video frames within rolling buffer may be taken from intra-frames of the video stream as received or from video frames resulting from decompression of the video stream.

At 2340, the at least one component of the viewing device, in response to receiving a signal indicative of a capture command, preserves the subset of video frames of the rolling buffer as a multiple-frame screenshot. As previously discussed, the quantity of video frames comprising the subset may be selected such that the screenshot is representative of a predetermined period of time's worth of the most recently visually displayed video frames of the video stream visually display up to the time the capture command is acted upon (e.g., up to the time the subset of the video frames is preserved).

Figure 7:
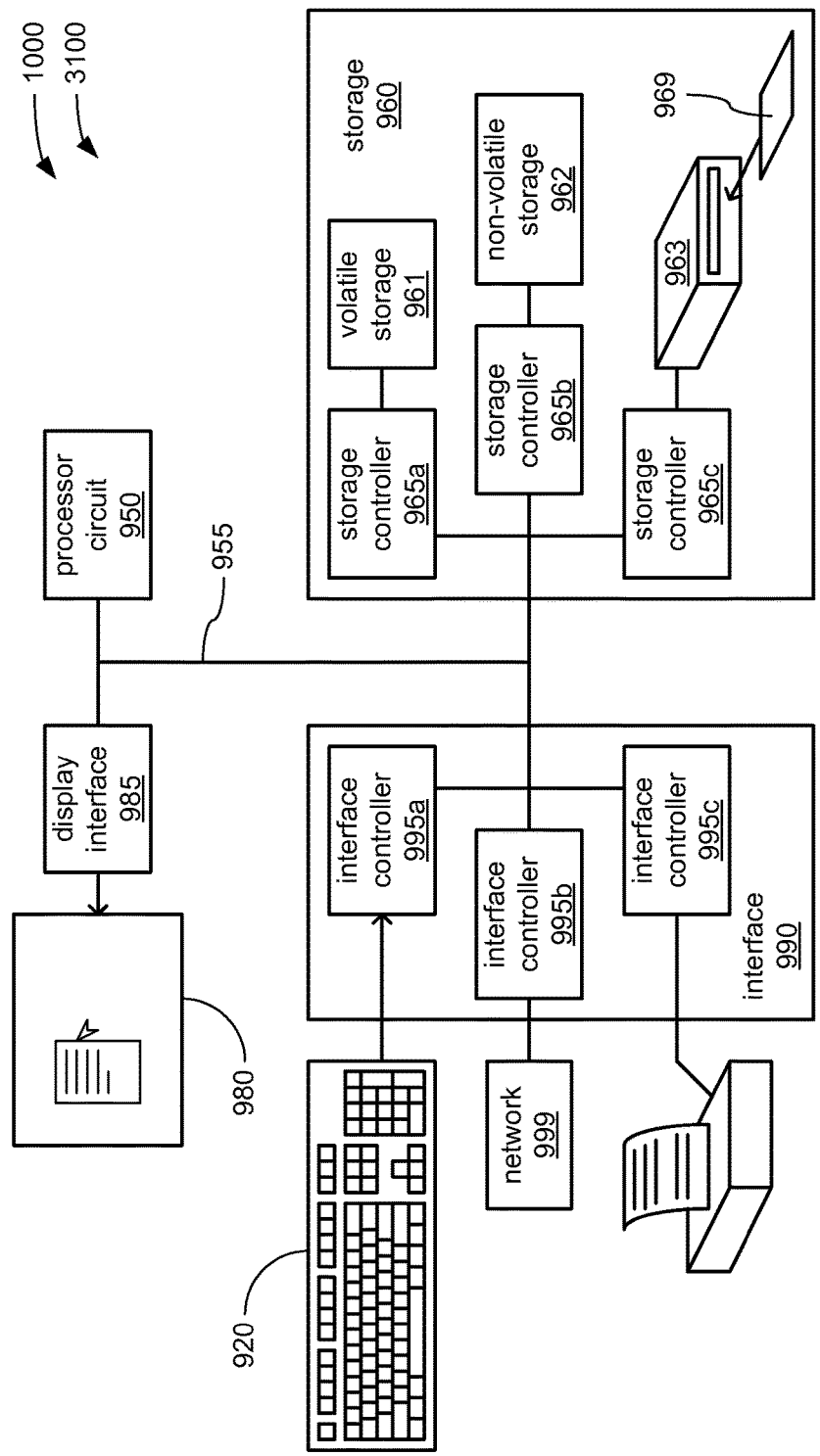
FIG. 7 illustrates an embodiment of a processing architecture.

FIG. 7 illustrates an embodiment of an exemplary processing architecture 3100 suitable for implementing various embodiments as previously described. More specifically, the processing architecture 3100 (or variants thereof) may be implemented as part of one or more of the computing devices 100, 300, 500 and 700. It should be noted that components of the processing architecture 3100 are given reference numbers in which the last two digits correspond to the last two digits of reference numbers of components earlier depicted and described as part of each of the computing devices 100, 300, 500 and 700. This is done as an aid to correlating such components of whichever ones of the computing devices 100, 300, 500 or 700 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985.

Coupling 955 is comprised of one or more buses, transceivers, buffers, crosspoint switches, and/or other conductors and/or logic that communicatively couples at least the processor circuit 950 to the storage 960. Coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing devices 100, 300, 500 or 700 implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150, 350, 550 or 740) may comprise any of a wide variety of commercially available processors, employing any of a wide variety of technologies and implemented with one or more cores physically combined in any of a number of ways.

As previously discussed, the storage 960 (corresponding to one or more of the storages 160, 360, 560 or 760) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 960 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 960 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 960 as that routine is executed.

As previously discussed, the interface 990 (corresponding to one or more of the interfaces 190, 390, 590 and 790) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 970) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999. The interface 995c may employ any of a variety of electrically conductive cabling enabling the use of either serial or parallel signal transmission to convey data to the depicted printer 970. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to one or both of the displays 380 and 580), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the devices 100, 300, 500 and 700 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example computer-implemented method comprises receiving, at a viewing device, a signal conveying a video stream from a source device communicatively coupled to the viewing device; presenting video frames associated with the video stream on a display of the viewing device; maintaining a rolling buffer comprising multiple video frames within a storage of the viewing device, the multiple video frames recurringly updated to represent a subset of video frames associated with the video stream most recently presented on the display; receiving a signal indicative of a capture command; and preserving the subset of video frames as a multiple-frame screenshot in response to the capture command.

The above example computer-implemented method, the video stream comprising a compressed video stream as received by the viewing device from the source device, and the subset of video frames comprising intra-frames of the video stream.

Either of the above examples of computer-implemented methods, comprising decompressing at least a portion of the video stream to provide video frames presented on the display.

Any of the above examples of computer-implemented methods, the subset of video frames comprising a subset of the video frames presented on the display selected at a regular interval.

Any of the above examples of computer-implemented methods, comprising receiving a signal indicative of operation of a control of the viewing device.

Any of the above examples of computer-implemented methods, comprising monitoring a camera of the viewing device for an indication of a gesture associated with a capture command.

Any of the above examples of computer-implemented methods, comprising receiving a signal from another device communicatively coupled to the viewing device, the signal from the other device indicative of manual operation of a control of the other device.

Any of the above examples of computer-implemented methods, the signal from the other device comprising a signal requesting the viewing device to transmit the subset of video frames to the other device, and the method comprising transmitting the subset of video frames to the other device.

Any of the above examples of computer-implemented methods, the subset of video frames being representative of a portion of the video frames presented on the display spanning a defined period of time up to the subset of video frames being preserved.

An example machine-readable storage medium comprising instructions that when executed by a computing device, causes the computing device to: receive a signal from a source device communicatively coupled to the computing device, the signal conveying a video stream from the source device to the computing device; present video frames associated with the video stream on a display associated with the computing device; maintain a rolling buffer comprising a plurality of video frames within the storage; recurringly update the plurality of video frames to represent a subset of video frames associated with the video stream most recently presented on the display; receive a signal indicative of a capture command; and preserve the subset of video frames as a multiple-frame screenshot in response to the capture command.

The above example machine-readable storage medium, the computing device caused to receive a signal from another device communicatively coupled to the computing device, the signal requesting the computing device to transmit the subset of video frames to the other device, and the computing device caused to transmit the subset of video frames to the other device.

Either of the above examples of machine-readable storage medium, the subset of video frames being representative of a portion of the video frames presented on the display spanning a defined period of time up to the subset of video frames being preserved.

An example apparatus comprises a processor circuit and a storage communicatively coupled to the processor circuit and storing a sequence of instructions that when executed by the processor circuit, causes the processor circuit to: receive a signal from a source device communicatively coupled to the apparatus, the signal conveying a video stream from the source device to the apparatus; present video frames associated with the video stream on a display associated with the apparatus; maintain a rolling buffer comprising a plurality of video frames within the storage; recurringly update the plurality of video frames to represent a subset of video frames associated with the video stream most recently presented on the display; receive a signal indicative of a capture command; and preserve the subset of video frames as a multiple-frame screenshot in response to the capture command.

The above example apparatus, the video stream comprising a compressed video stream as received by the apparatus from the source device, and the processor circuit caused to recurringly update the subset of video frames with intra-frames of the video stream.

Either of the above examples of apparatus, the processor circuit caused to decompress at least a portion of the video stream to provide video frames presented on the display.

Any of the above examples of apparatus, the subset of video frames comprising a subset of the video frames presented on the display selected at a regular interval.

Any of the above examples of apparatus, the processor circuit caused to receive a signal indicative of operation of a control of the apparatus, the apparatus comprising the control.

Any of the above examples of apparatus, the processor circuit caused to receive a wireless signal of a remote control comprising the control, the apparatus comprising the remote control.

Any of the above examples of apparatus, the processor circuit caused to receive a signal from a camera of the apparatus conveying an image of a gesture associated with a capture command and the control comprising the camera.

Any of the above examples of apparatus, the processor circuit caused to receive a signal from another device communicatively coupled to the apparatus, the signal from the other device indicative of manual operation of a control of the other device.

Any of the above examples of apparatus, the signal from the other device comprising a signal requesting the apparatus to transmit the subset of video frames to the other device, and the processor circuit caused to transmit the subset of video frames to the other device.

Any of the above examples of apparatus, the subset of video frames being representative of a portion of the video frames presented on the display spanning a defined period of time up to the subset of video frames being preserved.

Any of the above examples of apparatus, comprising the display.

Another example apparatus comprises a manually-operable control; a display; a processor circuit; and a storage communicatively coupled to the processor circuit and storing a sequence of instructions that when executed by the processor circuit, causes the processor circuit to: in response to first operation of the control, transmit a signal to a viewing device communicatively coupled to the apparatus, the signal conveying a capture command and an indication of the identity of the apparatus, to cause the viewing device to preserve a subset of video frames visually presented by the viewing device and associated with a video stream received by the viewing device from a source device, the subset of video frames being recurringly updated by the viewing device to be representative of video frames most recently visually presented by the viewing device up to the viewing device receiving the signal from the apparatus; receive the subset of video frames transmitted by the viewing device to the apparatus in response to the signal from the apparatus, the signal conveying a request to the viewing device to transmit the subset of video frames; and visually presenting one or more of the video frames of the subset of video frames on the display.

The above other example apparatus, the processor circuit caused, in response to second operation of the control, to select a video frame of the subset of video frames comprising an image and to visually present the video frame of the subset of video frames on the display.

Either of the above other examples of apparatus, the processor circuit caused, in response to third operation of the control, to select a portion of the image and to visually present the portion of the image on the display.

Any of the above other examples of apparatus, the processor circuit caused, in response to fourth operation of the control, to transmit the portion of the image to a server communicatively coupled to the apparatus to enable the server to employ the portion of the image in a visual search of a database to identify the image.

Any of the above other examples of apparatus, the processor circuit caused to receive results of the search from the server and to visually present the results of the search on the display.

The invention claimed is:
1. A computer-implemented method comprising:
receiving, at a viewing device, a signal conveying a video stream from a source device communicatively coupled to the viewing device;

presenting video frames associated with the video stream on a display of the viewing device;

maintaining a rolling buffer comprising multiple video frames within a storage of the viewing device, the multiple video frames recurringly updated to represent a first subset of video frames associated with the video stream presented on the display;

receiving a first signal indicative of a first capture command, the first signal including a unique identification of a first selection device, of a plurality of devices communicatively coupled to the viewing device;

marking the first subset of the video frames in the rolling buffer in response to the first capture command as being representative of a first portion of the video frames presented on the display spanning a first period of time up to the first capture command, the marked first subset of video frames in the rolling buffer excluding a first video frame stored in the rolling buffer and presented on the display at a time extending past the first period of time;

preserving the marked first subset of video frames as a first multiple-frame screenshot in response to the first capture command, the first multiple-frame screenshot excluding the first video frame and associated with the unique identification of the first selection device;

instantiating a new rolling buffer for the video stream within the storage of the viewing device:

maintaining the new rolling buffer to include additional video frames received from the source device, the additional video frames recurringly updated to represent a second subset of the additional video frames associated with the video stream presented on the display;

receiving a second signal indicative of a second capture command, the second signal including a unique identification of a second selection device of the plurality of devices;

marking the second subset of the video frames in the new rolling buffer in response to the second capture command as being representative of a second portion of the video frames presented on the display spanning a second period of time up to the second capture command, the marked second subset of video frames in the new rolling buffer excluding a second video frame stored in the new rolling buffer and presented on the display at a time extending past the second period of time; and preserving the marked second subset of the video frames as a second multiple-frame screenshot in response to the second capture command, the second multiple-frame screenshot associated with the unique identification of the second selection device.

2. The computer-implemented method of claim 1, the video stream comprising a compressed video stream as received by the viewing device from the source device, and the first subset of video frames in the rolling buffer comprising intra-frames of the video stream.

3. The computer-implemented method of claim 1, comprising decompressing at least a portion of the video stream to provide video frames presented on the display.

4. The computer-implemented method of claim 3, the marked first subset of video frames in the rolling buffer comprising a subset of the video frames presented on the display selected at a regular interval.

5. The computer-implemented method of claim 1, comprising receiving a signal indicative of operation of a control of the viewing device.

6. The computer-implemented method of claim 5, comprising monitoring a camera of the viewing device for an indication of a gesture associated with a capture command.

7. The computer-implemented method of claim 1, comprising receiving a signal indicative of manual operation of a control of the selection device.

8. The computer-implemented method of claim 7, the method comprising:

transmitting the marked first subset of video frames in the rolling buffer to the first selection device;

receiving, by the viewing device, additional video frames of the video stream from the source device, the additional video frames of the video stream subsequent to the multiple video frames stored in the rolling buffer; and presenting the additional video frames on the display of the viewing device.

9. At least one non-transitory machine-readable storage medium comprising instructions that when executed by a computing device, causes the computing device to:

receive, at the computing device, a signal conveying a video stream from a source device communicatively coupled to the computing device;

present video frames associated with the video stream on a display of the computing device;

maintain a rolling buffer comprising multiple video frames within a storage of the computing device, the multiple video frames recurringly updated to represent a first subset of video frames associated with the video stream presented on the display;

receive a first signal indicative of a first capture command, the first signal including a unique identification of a first selection device, of a plurality of devices communicatively coupled to the computing device;

mark the subset of video frames in the rolling buffer in response to the first capture command as being representative of a first portion of the video frames presented on the display spanning a first period of time up to the first capture command, the marked first subset of video frames in the rolling buffer excluding a first video frame stored in the rolling buffer and presented on the display at a time extending past the first period of time;

preserve the marked subset of video frames as a first multiple-frame screenshot in response to the first capture command, the first multiple-frame screenshot excluding the first video frame and associated with the unique identification of the first selection devices;

instantiate a new rolling buffer for the video stream within the storage of the computing device;

maintain the new rolling buffer to include additional video frames received from the source device, the additional video frames recurringly updated to represent a second subset of the additional video frames associated with the video stream most recently presented on the display;

receive a second signal indicative of a second capture command, the second signal including a unique identification of a second selection device of the plurality of devices;

mark the second subset of the video frames in the new rolling buffer in response to the second capture command as being representative of a second portion of the video frames presented on the display spanning a second period of time up to the second capture command, the marked second subset of video frames in the new rolling buffer excluding a second video frame stored in the new rolling buffer and presented on the display at a time extending past the second period of time; and preserve the marked second subset of the video frames as a second multiple-frame screenshot in response to the second capture command, the second multiple-frame screenshot associated with the unique identification of the second selection device.

10. The storage medium of claim 9, the video stream comprising a compressed video stream as received by the computing device from the source device, and the first subset of video frames in the rolling buffer comprising intra-frames of the video stream.

11. The storage medium of claim 9, the computing device caused to decompress at least a portion of the video stream to provide video frames presented on the display, and the marked first subset of video frames in the rolling buffer comprising a subset of the video frames presented on the display selected at a regular interval.

12. The storage medium of claim 9, the computing device caused to:

receive a signal indicative of manual operation of a control of the selection device and requesting the computing device to transmit the subset of video frames to the selection device;

transmit the marked first subset of video frames in the rolling buffer to the selection device;

receive, by the computing device, the additional video frames of the video stream from the source device, the additional video frames of the video stream subsequent to the multiple video frames stored in the rolling buffer; and present the additional video frames on the display.

13. An apparatus comprising:

a processor circuit; and a storage communicatively coupled to the processor circuit and storing a sequence of instructions that when executed by the processor circuit, causes the processor circuit to:

receive a signal from a source device communicatively coupled to the apparatus, the signal conveying a video stream from the source device to the apparatus;

present video frames associated with the video stream on a display associated with the apparatus;

maintain a rolling buffer comprising a plurality of video frames within the storage;

recurringly update the plurality of video frames to represent a first subset of video frames associated with the video stream presented on the display;

receive a first signal indicative of a first capture command, the first signal including a unique identification of a first selection device, of a plurality of devices communicatively coupled to the apparatus;

mark the first subset of video frames in the rolling buffer in response to the first capture command as being representative of a first portion of the video frames presented on the display spanning a first period of time up to the first capture command, the marked first subset of video frames in the rolling buffer excluding a first video frame stored in the rolling buffer and presented on the display at a time extending past the first period of time;

preserve the marked subset of video frames as a first multiple-frame screenshot in response to the first capture command, the first multiple-frame screenshot excluding the first video frame and associated with the unique identification of the first selection device;

instantiate a new rolling buffer for the video stream within the storage;

maintain the new rolling buffer to include additional video frames received from the source device, the additional video frames recurringly updated to represent a second subset of the additional video frames associated with the video stream most recently presented on the display;

receive a second signal indicative of a second capture command, the second signal including a unique identification of a second selection device of the plurality of devices;

mark the second subset of the video frames in the new rolling buffer in response to the second capture command as being representative of a second portion of the video frames presented on the display spanning a second period of time up to the second capture command, the marked second subset of video frames in the new rolling buffer excluding a second video frame stored in the new rolling buffer and presented on the display at a time extending past the second period of time; and preserve the marked second subset of the video frames as a second multiple-frame screenshot in response to the second capture command, the second multiple-frame screenshot associated with the unique identification of the second selection device.

14. The apparatus of claim 13, the video stream comprising a compressed video stream as received by the apparatus from the source device, and the processor circuit caused to recurringly update the first subset of video frames in the rolling buffer with intra-frames of the video stream.

15. The apparatus of claim 13, the processor circuit caused to decompress at least a portion of the video stream to provide video frames presented on the display.

16. The apparatus of claim 13, the marked first subset of video frames in the rolling buffer comprising a subset of the video frames presented on the display selected at a regular interval.

17. The apparatus of claim 13, the processor circuit caused to receive a signal indicative of operation of a control of the apparatus, the apparatus comprising the control.

18. The apparatus of claim 17, the processor circuit caused to receive a wireless signal of a remote control comprising the control, the apparatus comprising the remote control.

19. The apparatus of claim 17, the processor circuit caused to receive a signal from a camera of the apparatus conveying an image of a gesture associated with a capture command and the control comprising the camera.

20. The apparatus of claim 13, the processor circuit caused to receive a signal indicative of manual operation of a control of the selection device.

21. The apparatus of claim 20, the processor circuit caused to:

transmit the marked first subset of video frames in the rolling buffer to the selection device;

receive, by the apparatus, the additional video frames of the video stream from the source device, the additional video frames of the video stream subsequent to the multiple video frames stored in the rolling buffer; and present the additional video frames on the display.

22. The apparatus of claim 13, comprising the display.

* * * * *